US008781990B1

(12) United States Patent
de Alfaro et al.

(10) Patent No.: US 8,781,990 B1
(45) Date of Patent: Jul. 15, 2014

(54) CROWDSENSUS: DERIVING CONSENSUS INFORMATION FROM STATEMENTS MADE BY A CROWD OF USERS

(75) Inventors: Luca de Alfaro, Mountain View, CA (US); Radu Jurca, Adliswil (CH); Ashutosh Kulshreshtha, Sunnyvale, CA (US)

(73) Assignee: Google Inc., Mountain View, CA (US)

( * ) Notice: Subject to any disclaimer, the term of this patent is extended or adjusted under 35 U.S.C. 154(b) by 329 days.

(21) Appl. No.: 13/035,276

(22) Filed: Feb. 25, 2011

Related U.S. Application Data

(60) Provisional application No. 61/308,264, filed on Feb. 25, 2010.

(51) Int. Cl.
*G06F 9/44* (2006.01)

(52) U.S. Cl.
USPC .......................................................... 706/52

(58) Field of Classification Search
USPC .......................................................... 706/52
See application file for complete search history.

(56) References Cited

U.S. PATENT DOCUMENTS

| 6,456,622 | B1* | 9/2002 | Skaanning et al. | 370/389 |
|---|---|---|---|---|
| 6,631,362 | B1* | 10/2003 | Ullman et al. | 706/60 |
| 7,117,199 | B2* | 10/2006 | Frank et al. | 1/1 |
| 7,130,777 | B2 | 10/2006 | Garg et al. | |
| 7,263,506 | B2* | 8/2007 | Lee et al. | 705/38 |
| 7,440,875 | B2* | 10/2008 | Cuthbert et al. | 703/2 |
| 7,525,484 | B2* | 4/2009 | Dupray et al. | 342/450 |
| 7,764,231 | B1* | 7/2010 | Karr et al. | 342/457 |
| 7,788,030 | B2* | 8/2010 | Kato et al. | 701/467 |
| 7,822,631 | B1 | 10/2010 | Vander Mey et al. | |
| 8,015,183 | B2* | 9/2011 | Frank | 707/724 |
| 8,019,641 | B2* | 9/2011 | Foroutan | 705/12 |
| 8,103,445 | B2* | 1/2012 | Smith et al. | 701/425 |
| 8,185,448 | B1* | 5/2012 | Myslinski | 705/26.1 |
| 8,229,795 | B1* | 7/2012 | Myslinski | 705/26.1 |
| 8,321,295 | B1* | 11/2012 | Myslinski | 705/26.1 |
| 8,370,340 | B1 | 2/2013 | Yu et al. | |
| 8,533,146 | B1* | 9/2013 | Kulshreshtha et al. | 706/52 |
| 2002/0156917 | A1* | 10/2002 | Nye | 709/238 |
| 2003/0046098 | A1* | 3/2003 | Kim | 705/1 |
| 2003/0195793 | A1* | 10/2003 | Jain et al. | 705/10 |
| 2003/0200543 | A1* | 10/2003 | Burns | 725/16 |
| 2003/0225652 | A1* | 12/2003 | Minow et al. | 705/36 |
| 2006/0106535 | A1 | 5/2006 | Duncan et al. | |
| 2007/0121596 | A1 | 5/2007 | Kurapati et al. | |

(Continued)

OTHER PUBLICATIONS

Peter Welinder, et al, "Online crowdsourcing: Rating annotators and obtaining cost-effective labels," 2010 IEEE Computer Society Computer Vision and Pattern Recognition Workshops (CVPRW), Jun. 13-18, 2010, San Francisco, USA.*

(Continued)

*Primary Examiner* — Kakali Chaki
*Assistant Examiner* — Fuming Wu
(74) *Attorney, Agent, or Firm* — Fenwick & West LLP

(57) ABSTRACT

A system and method for updating and correcting facts that receives proposed values for facts from users and determines a consensus value for the fact based on a distribution of the probabilities that the proposed values are the correct value for the fact wherein the probability that the proposed value is the correct value for the fact is based on a score indicative of the probability that the user proposing the value proposes accurate values.

22 Claims, 4 Drawing Sheets

(56) References Cited

U.S. PATENT DOCUMENTS

| | | | |
|---|---|---|---|
| 2007/0210937 A1* | 9/2007 | Smith et al. ............... | 340/995.1 |
| 2007/0273558 A1* | 11/2007 | Smith et al. ............... | 340/995.1 |
| 2008/0010262 A1* | 1/2008 | Frank ........................... | 707/3 |
| 2008/0010273 A1* | 1/2008 | Frank ........................... | 707/5 |
| 2008/0010605 A1* | 1/2008 | Frank ........................... | 715/765 |
| 2008/0026360 A1* | 1/2008 | Hull ............................. | 434/324 |
| 2008/0046334 A1* | 2/2008 | Lee et al. .................... | 705/26 |
| 2009/0024589 A1 | 1/2009 | Sood et al. | |
| 2009/0182780 A1 | 7/2009 | Wong et al. | |
| 2009/0257621 A1* | 10/2009 | Silver .......................... | 382/103 |
| 2010/0017348 A1* | 1/2010 | Pinckney et al. ........... | 706/11 |
| 2010/0030578 A1* | 2/2010 | Siddique et al. ............ | 705/3 |
| 2010/0070930 A1 | 3/2010 | Thibault | |
| 2010/0131499 A1* | 5/2010 | van Leuken et al. ....... | 707/723 |
| 2010/0153324 A1* | 6/2010 | Downs et al. ............... | 706/21 |
| 2010/0153451 A1 | 6/2010 | Delia et al. | |
| 2010/0325179 A1* | 12/2010 | Tranter ........................ | 707/821 |
| 2010/0332119 A1 | 12/2010 | Geelen et al. | |
| 2011/0122153 A1* | 5/2011 | Okamura et al. ........... | 345/629 |
| 2011/0131172 A1 | 6/2011 | Herzog et al. | |
| 2011/0185401 A1 | 7/2011 | Bak et al. | |
| 2011/0208702 A1 | 8/2011 | Minde et al. | |
| 2012/0023057 A1 | 1/2012 | Winberry et al. | |
| 2012/0046860 A1 | 2/2012 | Curtis et al. | |
| 2012/0124057 A1 | 5/2012 | Daoud et al. | |
| 2012/0137367 A1* | 5/2012 | Dupont et al. .............. | 726/25 |
| 2012/0191357 A1* | 7/2012 | Qiu et al. ..................... | 702/19 |
| 2012/0197979 A1* | 8/2012 | Palm et al. ................... | 709/203 |
| 2012/0278321 A1* | 11/2012 | Traub et al. ................. | 707/736 |
| 2012/0317046 A1* | 12/2012 | Myslinski .................... | 705/329 |
| 2012/0317593 A1* | 12/2012 | Myslinski .................... | 725/14 |
| 2012/0323842 A1* | 12/2012 | Izhikevich et al. .......... | 707/608 |
| 2013/0031574 A1* | 1/2013 | Myslinski .................... | 725/14 |
| 2013/0110839 A1* | 5/2013 | Kirshenbaum .............. | 707/740 |
| 2013/0110847 A1* | 5/2013 | Sahuguet et al. ............ | 707/748 |

OTHER PUBLICATIONS

Peter Welinder, et al., "Online crowdsourcing: Rating annotators and obtaining cost-effective labels," 2010 IEEE Computer Society Computer Vision and Pattern Recognition Workshops (CVPRW), Jun. 13-18, 2010, San Francisco, USA.*

John R. G. Dyer, et al., "Consensus decision making in human crowds," Animal Behaviour, 2008, 75, 461-470.*

Sheetal Gupta, et al., "A Framework for Secure Knowledge Management in Pervasive Computing," In Proceedings of the Workshop on Secure Knowledge Management, Nov. 3-4, 2008, Dallas, Texas.*

B. Thomas Adler, et al., "Reputation Systems for Open Collaboration," Commun ACM. Aug. 2011 ; 54(8): 81-87.*

Webpage for "WikiTrust," Last modified on Dec. 1, 2008, 3 pages [online] [Archived on Webarchive.org on Feb. 15, 2009] [Retrieved on Aug. 26, 2011] Retrieved from the Internet <URL:http://web.archive.org/web/20090215034348/http:/wikitrust.soe.ucsc.edu/index.php/Main_Page>.

Webpage for "Epinions.com," 3 pages, [online] [Archived on Webarchive.org on Feb. 18, 2009] [Retrieved on Aug. 26, 2011] Retrieved from the Internet <URL:http://web.archive.org/web/20090218125001/http:/www.epinions.com/help/faq/?show=faq_wot.

Wikipedia, "PageRank," Last Modified Jan. 23, 2010, 6 pages, [online] [Archived on Webarchive.org on Jan. 27, 2010] [Retrieved on Aug. 26, 2011] Retrieved from the Internet <URL:http://web.archive.org/web/20100127052200/http://en.wikipedia.org/wiki/PageRank.

Wikipedia, "PageRank," Last Modified Jan. 25, 2009, 10 pages, [online] [Archived on Webarchive.org on Feb. 5, 2009] [Retrieved on Aug. 26, 2011] Retrieved from the Internet <URL:http://web.archive.org/web/20090205095353/http://en.wikipedia.org/wiki/PageRank.

Wikipedia, "Reputation system," Last Modified Jan. 21, 2010, 3 pages, [online] [Archived on Webarchive.org on Jan. 24, 2010] [Retrieved on Aug. 26, 2011] Retrieved from the Internet <URL:http://web.archive.org/web/20100124234509/http://en.wikipedia.org/wiki/Reputation_system.

Wikipedia, "Reputation system," 3 pages, [online] [Archived on Webarchive.org on Feb. 8, 2009] [Retrieved on Aug. 26, 2011] Retrieved from the Internet <URL:http://web.archive.org/web/20090208025738/http://en.wikipedia.org/wiki/Reputation_system.

Marriott, A., "Scalable Geospatial Object Database Systems," 2006, pp. 1-22.

Shyu, C-R., et al., "GeoIRIS: Geospatial Information Retrieval and Indexing System-Content Mining, Semantics Modeling, and Complex Queries," IEEE Trans Geosci Remote Sens, Apr. 2007, pp. 839-852, vol. 45, No. 4.

* cited by examiner

CROWDSENSUS: DERIVING CONSENSUS INFORMATION FROM STATEMENTS MADE BY A CROWD OF USERS

CROSS-REFERENCE TO RELATED APPLICATIONS

This application claims the benefit of U.S. provisional application 61/308,264 filed Feb. 25, 2010, the entire disclosure of which is incorporated by reference herein in its entirety for all purposes.

BACKGROUND OF THE INVENTION

1. Field of the Invention

The present invention relates to ascertaining a consensus value for facts from values proposed provided by users.

2. Description of the Background

Online information sources are now frequently updated and corrected by users of the information. All kinds of information on-line is editable by any user, such as business directories, maps, community pages, FAQs, and many other types of information. However that creates the problem of determining the accuracy of user-provided information. Users may be incorrect either on purpose or because the user is mistaken. For example, in the case of a phone number for a business, a user may wish to direct callers to a competing business and provide the competing business' phone number. Alternatively, the user may, as a prank, provide a completely unrelated phone number. Such intentionally incorrect information is unreliable and is also referred to as "spam."

Unreliable information is becoming more and more of a problem. Malicious users can intentionally mislead others using computer programs that repeatedly change the value of a map attribute to an unreliable value, even as other users correct the unreliable value.

In some approaches to assessing accuracy of user-provided information, expert reviewers assess the information. This however is laborious and time consuming. In extreme cases, it would require a reviewer to physically go somewhere to verify information. Under this approach, it may take days or weeks for incorrect or out-of-date information to be updated.

Errors from incorrect and outdated information lead to very frustrating experiences for users. For example, a user may obtain the phone number for a business from an on-line business directory. If that phone number is wrong, the user will not be able to contact the business. If the number is intentionally incorrect, for example the listed phone number is the phone number of a competing business, the user may even be mislead into contacting a business with whom they did not intend to do business.

SUMMARY OF THE INVENTION

In one embodiment, a system and method for updating information about features on maps provided by an online map hosting system allows users to update or correct information about attributes of map features that appear on maps. Users propose values for an attribute from a client device such as a personal computer or a mobile client device such as a smartphone, PDA, laptop, or the like. From the proposed values provided by users, the system determines a consensus value for the attribute of the map feature taking into account the accuracy of users providing the proposed values and the likelihood that the proposed value is unreliable. The consensus value is optionally provided to an online map hosting system that then displays the consensus value when that attribute of the map feature is requested by users of the online map hosting system. The system further determines a likelihood that any individual user provides unreliable information.

A geographic information system comprises a network interface configured to receive proposed values for attributes of map features from client devices. The geographic information system further comprises engines to determine the accuracy of users, the reliability of proposed values as well as users and a consensus value from the proposed values. The geographic information further comprises a user profile database to store profiles for users of the geographic information system and an attribute database to store proposed values for attributes.

The geographic information system optionally provides the determined consensus value for an attribute to an online map hosting system.

In another embodiment, the system and method can also be used to determine a consensus value from values proposed by users for various types of facts. Facts are extrinsically verifiable information.

The features and advantages described in this summary and the following detailed description are not all-inclusive. Many additional features and advantages will be apparent to one of ordinary skill in the art in view of the drawings, specification, and claims hereof.

DETAILED DESCRIPTION

Introduction

An online map is one example of an online information source that makes information about specific facts available to user. An online map includes a plurality of map features, each of which has multiple attributes. A feature and its attributes correspond to a fact which is extrinsically verifiable. A map feature is anything that might appear on a map that would be of interest to those using a map. Map features include, but are not limited to, natural features such as bodies of water, mountains, forests, rivers, and so forth; man-made features, such as cities, addresses, streets, businesses, airports, train stations, stadiums, ports, buildings; and points of interest (POI) such as historic sites, and landmarks. Attributes of map features are characteristics of the map feature that identify, locate, or describe the feature, and include, for example, the latitude and longitude of the map feature, and the name of the feature. Additional attributes are appropriate depending on the type of map feature. Street address is an attribute of many types of map features. Attributes of map features that are businesses include phone numbers, fax numbers, website address, email address and opening times. Generally, attributes are any pieces of information about a map feature that are useful to users of maps, and can describe the physical, contextual, or semantic aspects of a map feature.

Users communicate to a geographic information system proposed values for attributes of map features, for example when they are missing, out-of-date or incorrect. From the received proposed values for the attribute, the system determines a consensus value. In determining the consensus value, the system determines a number of factors (also called "scores"): the probability that a proposed value is accurate, the probability that the user proposing the value provides accurate information, the probability that the user who provided the value provides unreliable information and the probability that the proposed value is unreliable. The determination of a consensus values is an iterative process where the scores are determined multiple times until each of the scores converges. Then the consensus value is determined.

Architecture

Figure 1:
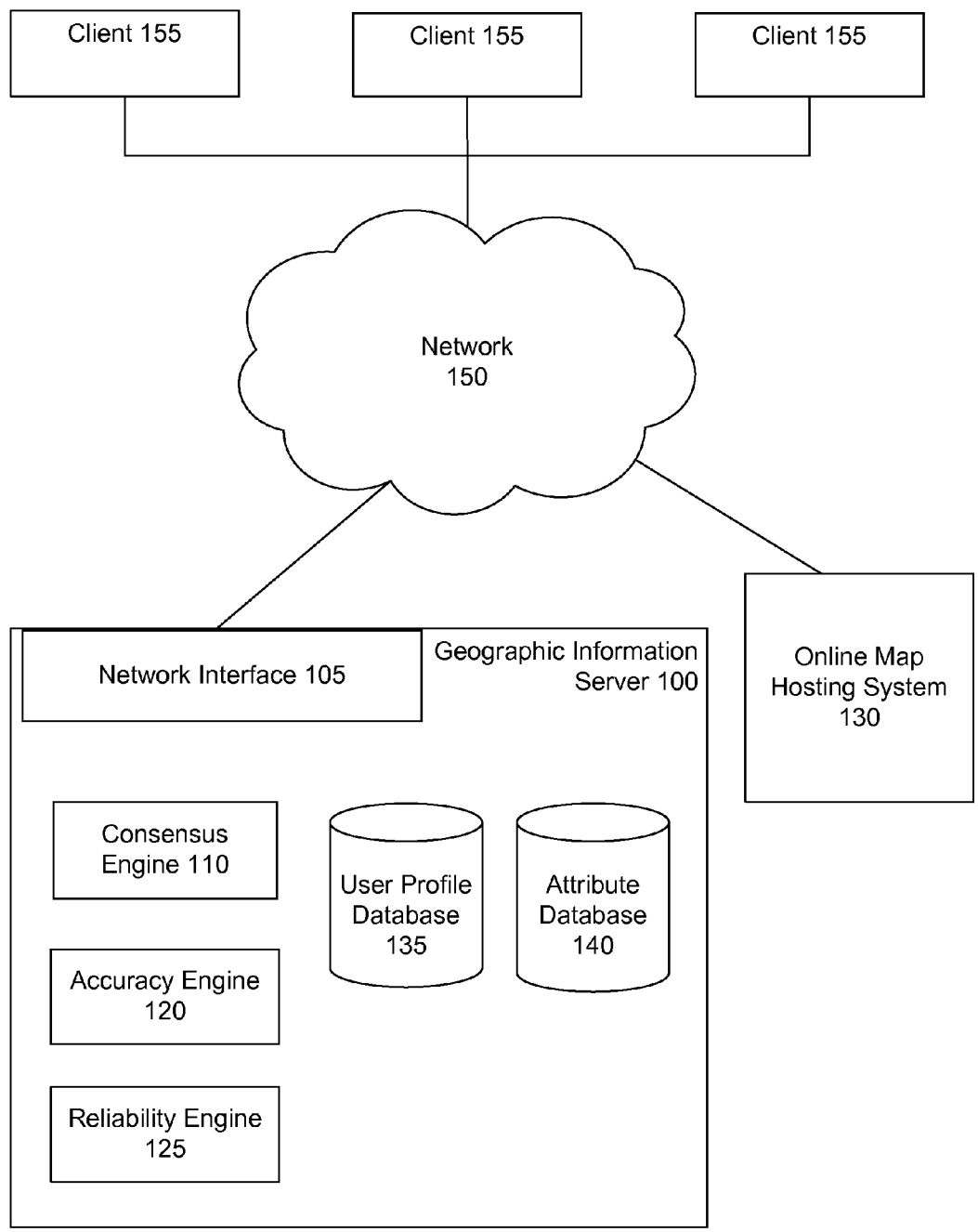
FIG. 1 is a diagram of a system architecture according to one embodiment.

FIG. 1 is a diagram of system architecture according to one embodiment. A geographic information ("GI") server 100 communicates with clients 155 and an online map hosting system 130 via a network interface 105 and a network 150.

The GI server 100 comprises a consensus engine 110, an accuracy engine 120, a reliability engine 125, a user profile database 135 and an attribute database 140. For simplicity, only one GI server 100, consensus engine 110, accuracy engine 120, reliability engine 125, user profile database 135 and attribute database 140 are shown but in practice many of each of these components may be in operation.

The GI server 100 is implemented as on one or more server-class computers comprising a CPU, memory, network interface, peripheral interfaces, and other well known components, and executing under the control of one or more server programs. The computers themselves preferably run an open-source operating system such as LINUX, have generally high performance CPUs, with 1G or more of memory, and 100G or more of disk storage. Of course, other types of computers can be used, and it is expected that as more powerful computers are developed in the future, they can be configured in accordance with the teachings here. The functionality implemented by any of the elements can be provided from computer program products that are stored in tangible, non-transitory computer accessible storage mediums (e.g., RAM, hard disk, or optical/magnetic media), or by equivalent implementations in hardware and/or firmware.

The network 150 is typically the Internet, but may also be any network, including but not limited to a LAN, a MAN, a WAN, a mobile, wired or wireless network, telecommunication network, a private network, or a virtual private network, and any combination thereof.

The client 155 is any type of device that is adapted to access the GI server 100 over the network 150 and that allows user to input information which the client 155 in turn transmits to the GI server 100. Examples include, but are not limited to, personal computing devices including handheld and mobile devices. Users can access online maps from the online map hosting system 130 (described below), and propose values for attributes of the map features via the client 155. The proposed attribute values are received at the GI server 100 via the network interface 105. The GI server 100 determines consensus values from the proposed values, and provides the consensus values to the online map hosting system 130. For simplicity only three clients 155 are shown; in practice there will be numerous clients 155 communicating with GI server 100.

The online map hosting system 130 is any web-based application known in the art that provides online maps and information about map features, such as business listings, to users. An exemplary online map hosting system 130 is GOOGLE™ Maps. Upon receiving a consensus value for an attribute for a map feature from the GI server 100, the online map hosting system 130 can incorporate the consensus value as the value for an attribute for the map feature in maps provided by the online map hosting system 130.

Figure 2:
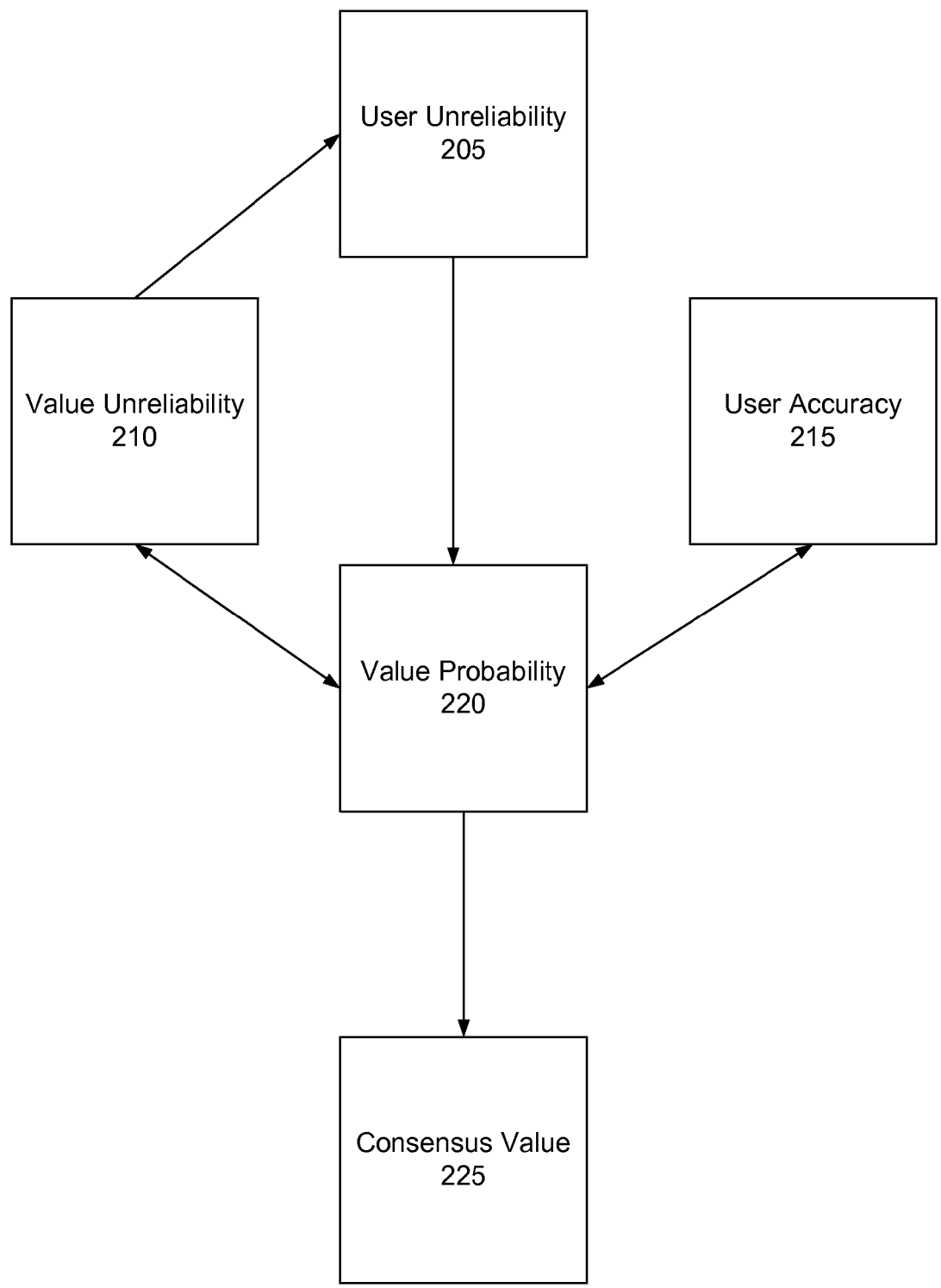
FIG. 2 illustrates the interrelation between the different computed values in determining the consensus value according to one embodiment.

Referring to FIG. 2 in addition to FIG. 1, a description of the components of the GI server 100 and an overview of the values determined by the engines is provided. The determination of each value described in greater detail after this overview. The accuracy engine 120 and reliability engine 125 each provide input to the consensus engine 110 which in turn determines the consensus value 225 for the attribute. The accuracy engine 120 determines a score ("user accuracy 215") indicative of how often the values proposed by a given user are accurate for the attribute for which they are proposed. A user has a high user accuracy score 215 when the values the user proposes have high probabilities of being the correct value.

The reliability engine 125 determines a score ("value unreliability 210") indicative of the likelihood a proposed value is unreliable, which is based on the value probability 220. The higher the score, the more likely the proposed value is unreliable, or spam. The value unreliability 210 takes into account all instances of a particular value being proposed regardless of the feature for which the value is being proposed. For example, the value unreliability 210 of the phone number 312-555-1212 is determined regardless of whether that phone number is being proposed for a pizza parlor, a library or a movie time information line.

Additionally, the reliability engine 125 determines a score ("user unreliability 205") indicative of the likelihood that each user having proposed a value provides unreliable information. The higher the user unreliability score, the more likely that the user is unreliable or a spammer.

The consensus engine 110 determines the value probability 220 which is the probability that a given value is the correct value for the attribute for which it is proposed. The value probability 220 is based on the user accuracy 215 of the user proposing the value and optionally on the value unreliability 210 as well. The value probabilities 220 for the values proposed for an attribute are analyzed by the consensus engine 110 to determine the consensus value 225 for the attribute. The operation of each of these engines is discussed in further detail below.

The user unreliability 205, value unreliability 210, user accuracy 215, value probability 220, and consensus value 225 are determined regularly in an iterative process. As the iterative process proceeds until the determined scores individually stabilize or converge. The process may perform a fixed number of iterations, or it may perform as many iterations as needed, until the difference between the quantities computed in two successive iteration steps is below a pre-defined threshold.

The user profile database 135 stores profiles for users of the GI server 100 including for each user, a user ID, the user accuracy 215, user unreliability 205 and reference to the values proposed by the user and the value probability 220 for the proposed values stored in the attribute database 140.

The attribute database 140 stores the proposed values proposed by users for attributes of the map features as well as the value unreliability 210 and value probability 220 for the proposed values.

Figure 3:
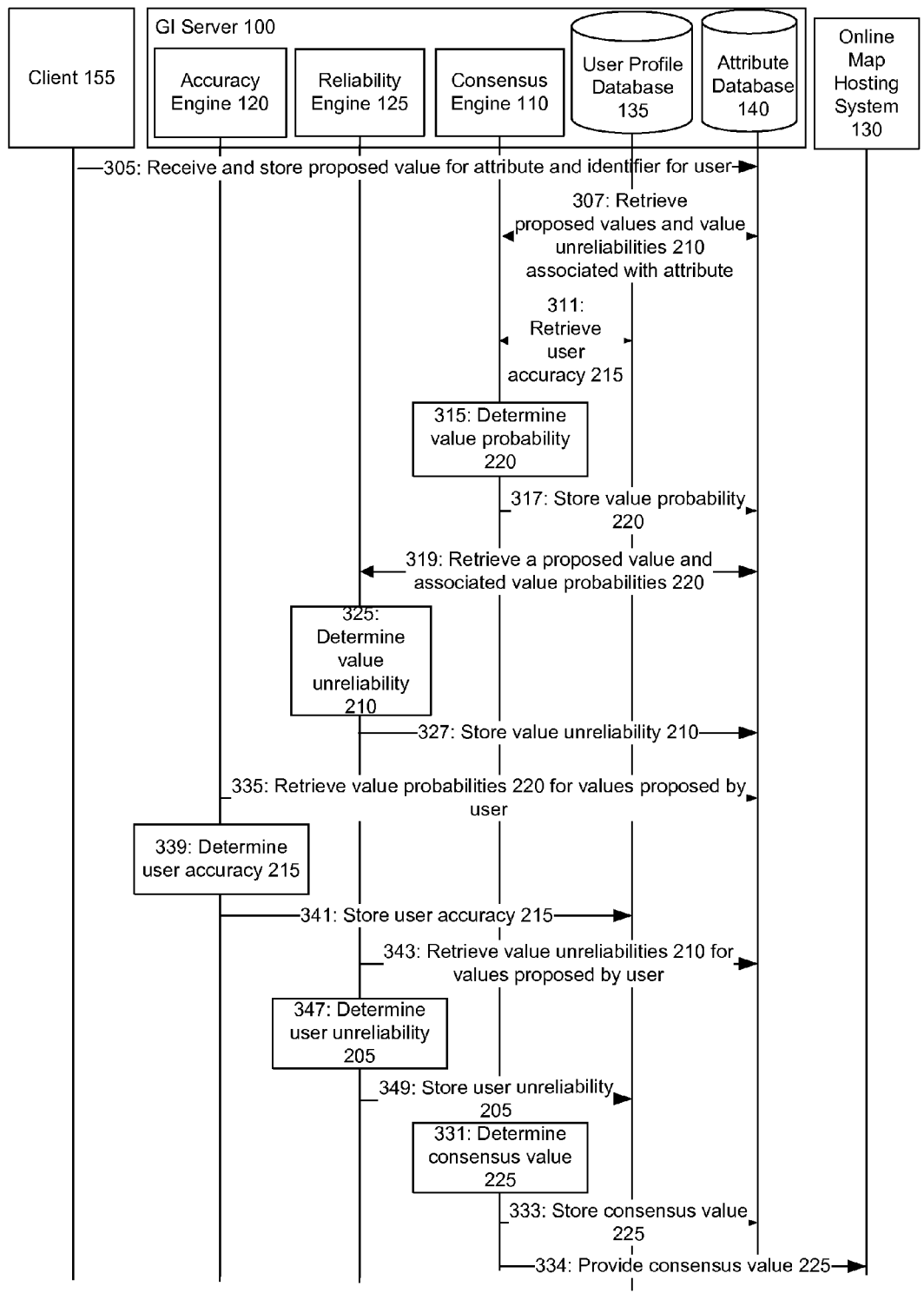
FIG. 3 is a data flow chart illustrating the process of determining the consensus value for an attribute of a feature according to one embodiment.

FIG. 3 illustrates an interaction diagram showing one embodiment of a process for determining the consensus value 225 for an attribute of a feature. Users input proposed values at their respective clients 155 which transmit them to the GI server 110. The proposed values are received 305 by the GI server 100 and stored in the attribute database 140. In one embodiment, a proposed value is in the form of the statement [u:e=x], user u proposes that attribute e has value x. The statement can also be represented as a 3-tuple: (u, e, x). The proposed value can be transmitted in the form of a message to the GI server 100, for example passing the components u, e, and x as parameters via a web page or web service. More generally, the GI server 100 exposes an application programming interface (API) by which users can input their proposed values, as well as make other requests.

The consensus engine 110 determines 315 the value probabilities 220 for the proposed values for an attribute. In order to determine 315 value probabilities 220 for the proposed values for an attribute, the consensus engine 110 retrieves 307 a subset of proposed values for the attribute as well as the value unreliability 210 for each from the attribute database 140. The consensus engine 110 also retrieves 311 the user accuracy 215 for the user providing each proposed value from the user profile database 135. These inputs are used to determine 315 the value probability 220.

Using a Bayesian model, value probability 220, s, for each proposed value x, is determined as follows:

$$s = Pr(g(e) = x \mid A(e)) = \frac{\bar{s}(x) \cdot \prod_{u \in U(e)} Pr([u:e=y] \mid q_u, x)}{\sum_{x'} \bar{s}(x') \cdot \prod_{u \in U(e)} Pr([u:e=y] \mid q_u, x')} \quad (1)$$

wherein:

$\bar{s}(x)$ is the a priori probability that x is the correct value $q_u$ is the user accuracy 215. When a user is new to the system, $q_u$ is set to a default. As the user proposes more values for attributes, $q_u$ is adjusted based on actual information about values proposed by the user.

A(e) is the set of statements made for the attribute, e

U(e) is the set of all users who proposed values for e

X(e) is the set of all proposed values, x, for e u(e) is the proposed value provided by a user for e g(e) is the true state of e In embodiments where value unreliability 210, $z_x$, is taken into account, $\bar{s}(x)$ is substituted by $$\bar{s}(x) \propto \frac{1 - z_x}{n_e}$$

wherein $n_e$ is the total number of different values that have been proposed for e. The value probabilities 220 are then stored 317 in the attribute database 140.

In an alternative embodiment, value probability 220 is determined through a voting inference when the user accuracy 215, $q_u$, is used as a weight for the proposed value provided by the user. Each user is essentially voting on the proposed value provided by the user for an attribute with the user's own history. This embodiment accounts for the fact that the values proposed by users are not statistically independent. Using voting inference, the value probability 220 is determined as follows:

$$s = \frac{\sum_{u \in U(e) \mid u(e) = x} f(q_u)}{\sum_{u \in U(e)} f(q_u)} \quad (2)$$

wherein $f(q_u)$ is an amount of support the proposed value has which can be the identity function or alternatively, it may be a non-negative function representing the cost, for a user, of achieving accuracy q.

In yet another alternative, the Bayesian and voting approaches are combined giving the following determination of the value probability 220:

$$s = r(x) \cdot \frac{\sum_{u \in U(e) \mid u(e) = x} f(q_u)}{\sum_{u \in U(e)} f(q_u)} \quad (3)$$

wherein r(x) is an existence probability for each proposed value, x and is determined as follows:

$$r(x) = \frac{\alpha \cdot \bar{s}(x) \cdot \prod_{u \in U(e) \mid u(e) = x} (1 + f(q_u))}{1 + \alpha \cdot \bar{s}(x) \cdot \prod_{u \in U(e) \mid u(e) = x} (1 + f(q_u))} \quad (4)$$

and wherein a is an attenuation factor and has the value $0 < a \le 1$ and the value unreliability 210, $z_x$, is taken into account by substituting $\bar{s}(x)$ with $$\bar{s}(x) \propto \frac{1 - z_x}{n_e}.$$

To determine 325 the value unreliability 210, the reliability engine 125 retrieves 319 from the attribute database 140 the instances that a particular value is proposed for any attribute as well as the value probability 220 for each of those instances that the value was proposed. For example, assume that a user provides as proposed value for the phone number of a particular business the string "312-555-1212". All instances of "312-555-1212" being proposed as the phone number for any feature that has a phone number is requested as well as the value probability 220 for each instance of "312-555-1212" being proposed. The reliability engine 125 determines 325 the value unreliability 210 for the proposed value and stores 327 it in the attribute database 140.

In one embodiment, the reliability engine 125 determines 325 value unreliability 210, $z_x$, for a value, x, as follows:

$$z_x = Pr(\tau \mid s_1, \ldots, s_n) = \frac{Pr(\tau) \cdot \prod_{i=1}^{n} Pr(s_i \mid \tau)}{\sum_{\tau' \in T} Pr(\tau') \cdot \prod_{i=1}^{n} Pr(s_i \mid \tau')} \quad (5)$$

wherein s is the value probability 220, τ is the reliability type, τ={$\tau_h, \tau_s$}, $\tau_h$ represents a reliable type value and $\tau_s$ represents an unreliable type value.

To determine 339 user accuracy 215, the accuracy engine 120 retrieves 335 the value probabilities 220 for proposed values provided by the user. The accuracy engine 120 then determines 339 the user accuracy 215. In one embodiment, the user accuracy 215 is the average of the value probabilities 220 for all of the proposed values provided by the user. Optionally, the accuracy engine 120 requests value probabilities 220 for only a subset of proposed values provided by a user. In such an embodiment, the accuracy engine 120 may only request value probabilities 220 for proposed values provided recently such as for example in the last month, six months or a year. In yet another alternative, the value probabilities 220 for values proposed by the user are weighted based on the elapsed time since the user proposed that value with value probabilities for more recent proposed values weighted more heavily.

In one embodiment, to determine user accuracy 215, the value probabilities 220 for proposed values provided by the user are recalculated without the data provided by that user. These value probabilities 220 are used in the determination of user accuracy 215. Removing the user's own data from the determination of value probabilities 220 for values the user has proposed removes a self-congratulatory effect where a user's own submissions could inflate the user's accuracy score. The user accuracy 215 is stored 341 in the user profile database 135.

To determine user unreliability 205, the reliability engine 125 retrieves 343 the value unreliabilities 210 for proposed values provided by the user. The reliability engine 125 then determines 347 the user unreliability 205. The user unreliability is determined using Equation 5 with $\tau$ is the reliability type, $T=\{\tau_h,\tau_s\}$, $\tau_h$ represents a reliable type user and $\tau_s$ represents an unreliable type user The user unreliability 205 is stored 349 in the user profile database 135.

The determined value probabilities 220 are used for a probability distribution over the subset of proposed values, x, which in turn is used to determine the consensus value 225. The consensus value 225 is the value whose value probability 220 is at the top of the peak of the distribution. Consensus value 225 is determined after the value probability and its inputs, user accuracy and optionally, value unreliability and user unreliability, have been iterated multiple times and those values are converging.

The value probabilities 220 are used for a probability distribution over the subset of proposed values which in turn is used to determine 331 the consensus value 225. The consensus engine 110 stores 333 the determined consensus value 225 in the attribute database 140 as the value for the attribute for which it was proposed and optionally provides 334 the consensus value 225 to the online map hosting system 130. The online map hosting system 130 then displays the consensus value 225 as the value for the attribute on maps provided to users.

Example 1

Table 1 shows a dataset of phone numbers proposed for three features: Pizza House, Hair Salon and Flower Shop by 5 users, A, B, C, D and E. A has proposed the same phone number for all three features. A is probably a spammer and thus an unreliable user and the value 312-555-1212 is likely an unreliable value. Of the other four proposed values for the phone number for Pizza House, three are the same and one is off by one digit from the three that are the same. It is likely that user E just made a mistake or a typo when proposing the phone number for Pizza House rather than purposely proposing the wrong phone number. The disclosed methods make these determinations automatically. The example shows the method through multiple iterations.

TABLE 1

Statements of Users

| Feature | Attribute Value | Users |
|---|---|---|
| Flower Shop | 312-555-1212 | A |
| Flower Shop | 312-256-3636 | D, E |
| Hair Salon | 312-555-1212 | A |
| Pizza House | 312-555-1212 | A |
| Pizza House | 312-749-9992 | B, C, D |
| Pizza House | 312-749-9996 | E |

In this example no information is yet known about these users and an a priori user accuracy is set. The a priori user accuracy is programmed and in this example is set to 0.7. The value probabilities 220 are determined using the a priori user accuracy 215 and are shown in Table. 2.

TABLE 2

First Iteration Value Probabilities

| Feature | Attribute Value | Value probability |
|---|---|---|
| Flower Shop | 312-555-1212 | 0.1500 |
| Flower Shop | 312-256-3636 | 0.8500 |
| Hair Salon | 312-555-1212 | 1.0000 |
| Pizza House | 312-555-1212 | 0.0152 |
| Pizza House | 312-749-9992 | 0.9697 |
| Pizza House | 312-749-9996 | 0.0152 |

The value probabilities are added back to the model to determine calculated user accuracies 215, shown in Table 3. In this embodiment, user accuracy 215 is capped at 0.9500. User A who is likely a spammer has a lower user accuracy. User E does as well.

TABLE 3

First Iteration User Accuracies

| User | User Accuracy |
|---|---|
| A | 0.0826 |
| B | 0.9500 |
| C | 0.9500 |
| D | 0.9098 |
| E | 0.4326 |

The calculated user accuracies 215 are added back into the model to determine the value unreliability 210 as shown in Table 4. The spam phone number 312-555-1212 has a high unreliability score. The two numbers that have high value probabilities 220 as correct numbers for Pizza House and Flower Shop, have a 0 score for value unreliability 210.

TABLE 4

First Iteration Value Unreliabilities

| Value | Value Unreliability |
|---|---|
| 312-256-3636 | 0.0000 |
| 312-749-9996 | 0.0020 |
| 312-749-9992 | 0.0000 |
| 312-555-1212 | 0.0446 |

User unreliabilities 205 are determined and shown in Table 5. The highest score is for user A who proposed the same phone number for three different businesses.

TABLE 5

First Iteration User Unreliabilities

| User | User Unreliability |
|---|---|
| A | 0.0446 |
| B | 0.0000 |
| C | 0.0000 |
| D | 0.0000 |
| E | 0.0010 |

The system iterates the values a second time. Using user accuracies 215 determined in Table 3 the value probability 220 is determined again and the results are shown in Table 6.

TABLE 6

Second Iteration Value Probabilities

| Feature | Attribute Value | Value probability |
|---|---|---|
| Flower Shop | 312-555-1212 | 0.0206 |
| Flower Shop | 312-256-3636 | 0.9794 |
| Hair Salon | 312-555-1212 | 1.0000 |
| Pizza House | 312-555-1212 | 0.0000 |
| Pizza House | 312-749-9992 | 1.0000 |
| Pizza House | 312-749-9996 | 0.0000 |

The second iteration of value probabilities 220 are added back in to system for determining a second iteration of user accuracies shown in Table 7. The user accuracy 215 for user A, the spammer, is decreasing.

TABLE 7

Second Iteration User Accuracies

| User | User Accuracy |
|---|---|
| A | 0.0103 |
| B | 0.9500 |
| C | 0.9500 |
| D | 0.9500 |
| E | 0.4897 |

Using the second iteration user accuracies 215, second iteration value unreliabilities 210 are determined and are shown in Table 8. The two numbers that were provided only for the businesses for which they are the phone number 312-256-3636 for Flower Shop and 312-749-9992 for Pizza House still have a 0 score indicating that they are reliable as opposed to unreliable. The value unreliability 210 for 312-555-1212, the spam number, has risen.

TABLE 8

Second Iteration Value Unreliabilities

| Value | Spam Probability |
|---|---|
| 312-256-3636 | 0.0000 |
| 312-749-9996 | 0.0026 |
| 312-749-9992 | 0.0000 |
| 312-555-1212 | 0.1567 |

Using second iteration values, the user unreliabilities 205 are determined again. The spammer, User A, has the highest user unreliability 205 score.

TABLE 9

Second Iteration User Unreliabilities

| User | User Unreliability |
|---|---|
| A | 0.1567 |
| B | 0.0000 |
| C | 0.0000 |
| D | 0.0000 |
| E | 0.0013 |

Consensus values 225 after this second iteration are 312-256-3636 as the phone number for Flower Shop; 312-555-1212 for Hair Salon and 312-749-9992 for Pizza House.

Example 2

In an alternative embodiment, the system determines a consensus value 225 without assessing value unreliability 210 and user unreliability 205. The process proceeds at first as in Example 1.

TABLE 10

Statements of Users

| Feature | Attribute Value | Users |
|---|---|---|
| Flower Shop | 312-555-1212 | A |
| Flower Shop | 312-256-3636 | D, E |
| Hair Salon | 312-555-1212 | A |
| Pizza House | 312-555-1212 | A |
| Pizza House | 312-749-9992 | B, C, D |
| Pizza House | 312-749-9996 | E |

An a priori user accuracy is used again and set to 0.7. The value probabilities are determined using the a priori user accuracy and are shown in Table. 11. These are the same as in Example 1 because the value unreliability 210 has not entered the calculation yet.

TABLE 11

First Iteration Value Probabilities

| Feature | Attribute Value | Value probability |
|---|---|---|
| Flower Shop | 312-555-1212 | 0.1500 |
| Flower Shop | 312-256-3636 | 0.8500 |
| Hair Salon | 312-555-1212 | 1.0000 |
| Pizza House | 312-555-1212 | 0.0152 |
| Pizza House | 312-749-9992 | 0.9697 |
| Pizza House | 312-749-9996 | 0.0152 |

The value probabilities are added back to the model to determine calculated user accuracies, shown in Table 12. Because the value unreliability 210 has not entered the calculation yet, these values too are the same as in Example 1. Again, in this example user accuracy 215 is capped at 0.9500.

TABLE 12

First Iteration User Accuracies

| User | User Accuracy |
|---|---|
| A | 0.0826 |
| B | 0.9500 |
| C | 0.9500 |
| D | 0.9098 |
| E | 0.4326 |

The system iterates the values a second time. Using user accuracies 215 determined in Table 10 the value probability 220 is determined and the results are shown in Table 13.

TABLE 13

Second Iteration Value Probabilities

| Feature | Attribute Value | Value probability |
| --- | --- | --- |
| Flower Shop | 312-555-1212 | 0.0216 |
| Flower Shop | 312-256-3636 | 0.9784 |
| Hair Salon | 312-555-1212 | 1.0000 |
| Pizza House | 312-555-1212 | 0.0000 |
| Pizza House | 312-749-9992 | 1.0000 |
| Pizza House | 312-749-9996 | 0.0000 |

The second iteration of value probabilities 220 are added back in to system for determining a second iteration of user accuracies 215 shown in Table 14.

TABLE 14

Second Iteration User Accuracies

| User | User Accuracy |
| --- | --- |
| A | 0.0108 |
| B | 0.9500 |
| C | 0.9500 |
| D | 0.9500 |
| E | 0.9318 |

Consensus values 225 after this second iteration are 312-256-3636 as the phone number for Flower Shop; 312-555-1212 for Hair Salon and 312-749-9992 for Pizza House.

Example 3

Figure 4:
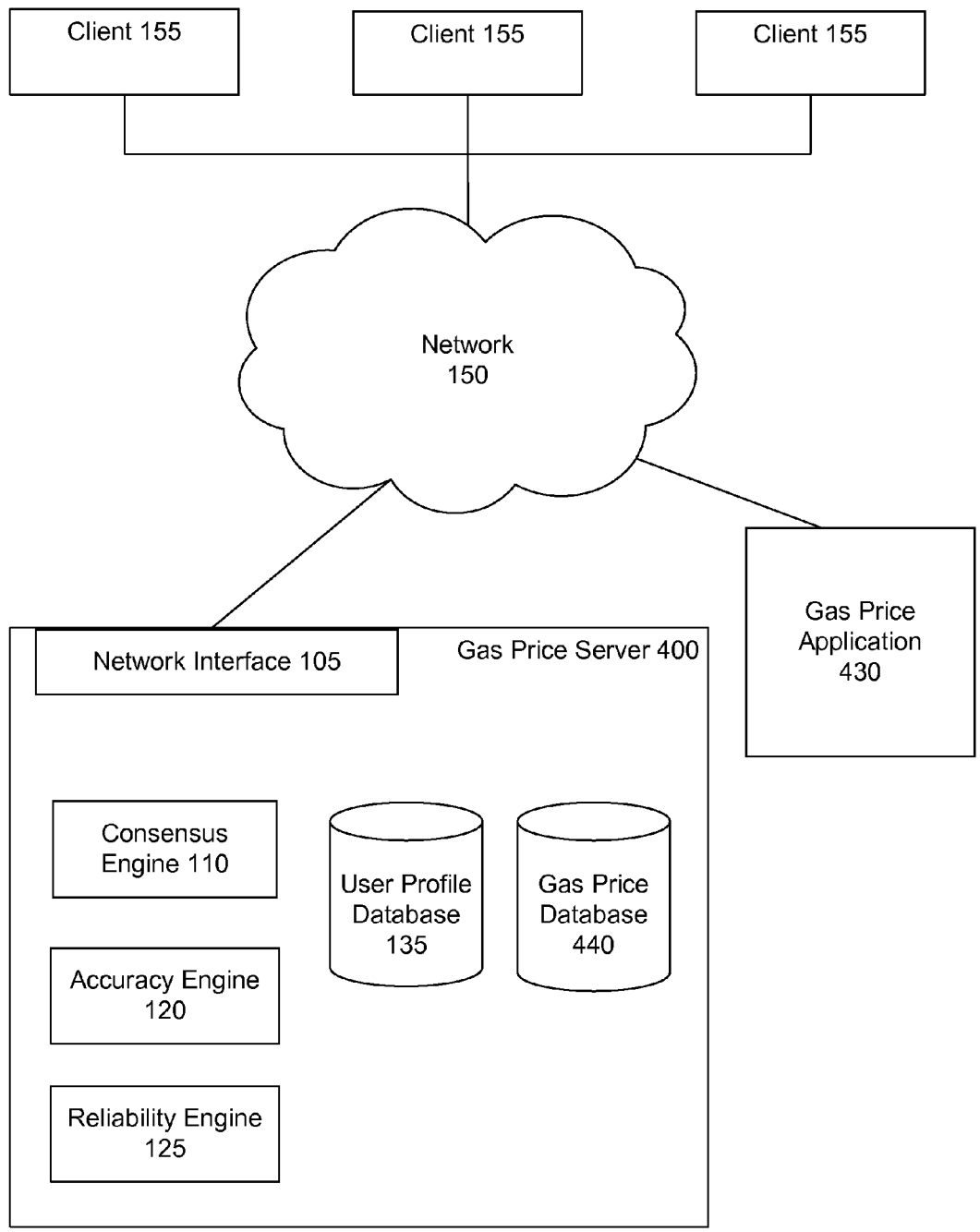
FIG. 4 is a diagram of a system architecture according to one embodiment.

FIG. 4 illustrates a system architecture for another application of the system and method. In this embodiment, consensus values 225 are determined for gas prices at gas stations. There is a motivation for owners of gas stations to spam sites like GasBuddy.com by posting gas prices at their own stations that are lower than the actual prices (and/or posting prices for competing gas stations that are higher than the actual prices) to attract business to their gas station. Thus in order for users to have confidence in gas price websites, those sites would want to weed out incorrect information. The gas price server 400 comprises a consensus engine 110, accuracy engine 120, reliability engine 125, user profile database 135 and gas price database 440. The gas prices in the database 440 would an example of the types of facts that users could edit. The determination of a consensus value 225 for the price of gas at a particular gas station proceeds as described previously.

The present invention has been described in particular detail with respect to several possible embodiments. Those of skill in the art will appreciate that the invention may be practiced in other embodiments. First, the particular naming of the components, capitalization of terms, the attributes, data structures, or any other programming or structural aspect is not mandatory or significant, and the mechanisms that implement the invention or its features may have different names, formats, or protocols. Further, the system may be implemented via a combination of hardware and software, as described, or entirely in hardware elements. Also, the particular division of functionality between the various system components described herein is merely exemplary, and not mandatory; functions performed by a single system component may instead be performed by multiple components, and functions performed by multiple components may instead performed by a single component.

Some portions of above description present the features of the present invention in terms of methods and symbolic representations of operations on information. These descriptions and representations are the means used by those skilled in the data processing arts to most effectively convey the substance of their work to others skilled in the art. These operations, while described functionally or logically, are understood to be implemented by computer programs. Furthermore, it has also proven convenient at times, to refer to these arrangements of operations as modules or by functional names, without loss of generality.

Unless specifically stated otherwise as apparent from the above discussion, it is appreciated that throughout the description, discussions utilizing terms such as "determining" or "displaying" or the like, refer to the action and processes of a computer system, or similar electronic computing device, that manipulates and transforms data represented as physical (electronic) quantities within the computer system memories or registers or other such information storage, transmission or display devices.

Certain aspects of the present invention include process steps and instructions described herein in the form of an algorithm. It should be noted that the process steps and instructions of the present invention could be embodied in software, firmware or hardware, and when embodied in software, could be downloaded to reside on and be operated from different platforms used by real time network operating systems.

The present invention also relates to an apparatus for performing the operations herein. This apparatus may be specially constructed for the required purposes, or it may comprise a general-purpose computer selectively activated or reconfigured by a computer program stored on a computer readable medium that can be accessed by the computer. Such a computer program may be stored in a tangible computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Furthermore, the computers referred to in the specification may include a single processor or may be architectures employing multiple processor designs for increased computing capability.

The methods and operations presented herein are not inherently related to any particular computer or other apparatus. Various general-purpose systems may also be used with programs in accordance with the teachings herein, or it may prove convenient to construct more specialized apparatus to perform the required method steps. The required structure for a variety of these systems will be apparent to those of skill in the, along with equivalent variations. In addition, the present invention is not described with reference to any particular programming language. It is appreciated that a variety of programming languages may be used to implement the teachings of the present invention as described herein, and any references to specific languages are provided for invention of enablement and best mode of the present invention.

The present invention is well suited to a wide variety of computer network systems over numerous topologies. Within this field, the configuration and management of large networks comprise storage devices and computers that are communicatively coupled to dissimilar computers and storage devices over a network, such as the Internet, public networks, private networks, or other networks enabling communication between computing systems. Finally, it should be noted that the language used in the specification has been principally selected for readability and instructional purposes, and may not have been selected to delineate or circumscribe the inventive subject matter. Accordingly, the disclosure of the present invention is intended to be illustrative, but not limiting, of the scope of the invention, which is set forth in the following claims.

We claim:

1. A computer-implemented method for determining a consensus value for an attribute of a map feature, the method executed by a computer system, comprising:
    receiving a plurality of proposed values for the attribute of the map feature, each proposed value provided by a user;
    iteratively determining for each user proposing a value in the plurality of proposed values a first score indicative of an accuracy of the user until the difference between the determined first scores determined in two successive iterations is below a pre-defined threshold;
    iteratively determining for each proposed value in the plurality of proposed values a second score indicative of a probability that the proposed value is a correct value for the attribute until the difference between the determined second scores determined in two successive iterations is below a pre-defined threshold and wherein the second score is based at least in part on the first score for each user proposing the proposed value;
    determining from the plurality of proposed values a consensus value for the attribute, by:
        determining a probability distribution of the proposed values based at least in part on the second score; and
        determining the consensus value for the attribute based at least in part on the probability distribution; and
    storing the consensus value of the attribute.

2. The method of claim 1 further comprising iteratively determining a third score indicative of a probability that the proposed value is an unreliable value until the difference between the determined third scores determined in two successive iterations is below a pre-defined threshold and wherein the second score is based at least in part on the third score.

3. The method of claim 1 further comprising iteratively determining a fourth score indicative of a probability that the user providing the proposed value provides unreliable values until the difference between the determined fourth scores determined in two successive iterations is below a pre-defined threshold and wherein the second score is based at least in part on the fourth score.

4. The method of claim 3 further comprising updating a user profile for the user providing the proposed value based upon the fourth score.

5. The method of claim 1 wherein determining the second score comprises Bayesian inference.

6. The method of claim 1 further comprising providing the consensus value of the attribute to a second user in response to a search query.

7. The method of claim 1 further comprising updating a user profile for the user providing the proposed value based upon the first score.

8. The method of claim 1 wherein the attribute was missing a value prior to determination of the consensus value.

9. A system for determining a consensus value for an attribute of a map feature comprising:
    one or more processors for executing program code; and
    a non-transitory computer-readable storage medium storing executable program code for:
        receiving a plurality of proposed values for the attribute of the map feature, each proposed value provided by a user;
        iteratively determining for each user proposing a value in the plurality of proposed values a first score indicative of an accuracy of the user until the difference between the determined first scores determined in two successive iterations is below a pre-defined threshold;
        iteratively determining for each of the plurality of proposed values a second score indicative of a probability that the proposed value is a correct value for the attribute until the difference between the determined second scores determined in two successive iterations is below a pre-defined threshold and wherein the second score is based at least in part on the first score for each user proposing the proposed value;
        determining a probability distribution of the proposed values in the plurality of proposed values based at least in part on the second score for each proposed value in the plurality of proposed values; and
        determining a consensus value for the attribute based at least in part on the probability distribution.

10. The system of claim 9 further comprising executable program code for updating a user profile for the user based upon the first score.

11. The system of claim 9 further comprising executable program code for iteratively determining for each of the plurality of proposed values a third score indicative of a likelihood that the proposed value is unreliable until the difference between the determined third scores determined in two successive iterations is below a pre-defined threshold and determining the second score based at least in part on the third score.

12. The system of claim 9 further comprising executable program code for iteratively determining a fourth score indicative of a probability that the user providing the proposed value provides unreliable values until the difference between the determined fourth scores determined in two successive iterations is below a pre-defined threshold and determining the second score based at least in part on the fourth score.

13. The system of claim 12 further comprising executable program code for updating a user profile for the user providing the proposed value based upon the fourth score.

14. The system of claim 9 wherein the attribute was missing a value prior to determination of the consensus value.

15. A non-transitory computer-readable storage medium containing program code executable by a computer to determine a consensus value for an attribute of a map feature, comprising program code that instructs one or more computer processors to:
    receive a plurality of proposed values for the attribute of the map feature, each proposed value provided by a user;
    iteratively determine for each user proposing a value in the plurality of proposed values a first score indicative of an accuracy of the user until the difference between the determined first scores determined in two successive iterations is below a pre-defined threshold;
    iteratively determine for each of the plurality of proposed values a second score indicative of a probability that the proposed value is a correct value for the attribute until the difference between the determined second scores determined in two successive iterations is below a pre-defined threshold and wherein the second score is based at least in part on the first score for each user proposing the proposed value;

determine from the plurality of proposed values a consensus value for the attribute, by:
  determining a probability distribution of all of the proposed values in the plurality of proposed values based at least in part on the second score for each proposed value in the plurality of proposed values; and
  determining the consensus value for the attribute based at least in part on the probability distribution; and
store the consensus value of the attribute.

16. The non-transitory computer-readable storage medium of claim 15 wherein determining the second score comprises Bayesian inference.

17. The non-transitory computer-readable storage medium of claim 15 further comprising iteratively determining a third score indicative of a probability that the proposed value is an unreliable value until the difference between the determined third scores determined in two successive iterations is below a pre-defined threshold and wherein the second score is based at least in part on the third score.

18. The non-transitory computer-readable storage medium of claim 15 further comprising iteratively determining a fourth score indicative of a probability that the user providing the proposed value provides unreliable values until the difference between the determined fourth scores determined in two successive iterations is below a pre-defined threshold and wherein the second score is based at least in part on the fourth score.

19. The non-transitory computer-readable storage medium of claim 15 further comprising program code that instructs one or more computer processors to provide the consensus value of the attribute to a second user in response to a search query.

20. The non-transitory computer-readable storage medium of claim 15 further comprising program code that instructs one or more computer processors to update a user profile for the user providing each proposed value based upon the first score.

21. The non-transitory computer-readable storage medium of claim 18 further comprising program code that instructs one or more computer processors to update a user profile for the user providing each proposed value based upon the fourth score.

22. The non-transitory computer-readable storage medium of claim 15 wherein the attribute was missing a value prior to determination of the consensus value.

* * * * *